(12) United States Patent
Yanagidaira et al.

(10) Patent No.: US 7,146,272 B2
(45) Date of Patent: Dec. 5, 2006

(54) NAVIGATION SYSTEM AND NAVIGATION METHOD FOR MOVABLE BODY, PROGRAM STORAGE DEVICE AND COMPUTER DATA SIGNAL EMBODIED IN CARRIER WAVE

(75) Inventors: Masatoshi Yanagidaira, Tsurugashima (JP); Mitsuo Yasushi, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 329 days.

(21) Appl. No.: 10/216,451

(22) Filed: Aug. 12, 2002

(65) Prior Publication Data

US 2003/0033082 A1    Feb. 13, 2003

(30) Foreign Application Priority Data

Aug. 13, 2001 (JP) ............................. 2001-245730

(51) Int. Cl.
    *G01C 21/26*    (2006.01)
(52) U.S. Cl. .................. 701/207; 701/208; 701/209; 340/435; 340/436; 340/903
(58) Field of Classification Search ............... 701/201, 701/207, 208, 209, 211, 212, 214; 340/988, 340/990, 995, 435, 436, 903
    See application file for complete search history.

(56) References Cited

U.S. PATENT DOCUMENTS

| 5,428,545 | A | * | 6/1995 | Maegawa et al. ........... 701/210 |
| 5,539,397 | A | | 7/1996 | Asanuma et al. |
| 5,748,476 | A | * | 5/1998 | Sekine et al. ................. 701/93 |
| 6,034,626 | A | * | 3/2000 | Maekawa et al. ........... 340/995 |
| 6,278,928 | B1 | * | 8/2001 | Aruga et al. ................. 701/65 |
| 2002/0024713 | A1 | * | 2/2002 | Roberts et al. ............. 359/267 |
| 2003/0209893 | A1 | * | 11/2003 | Breed et al. ................ 280/735 |

FOREIGN PATENT DOCUMENTS

| EP | 0 713 675 A2 | 5/1996 |
| EP | 1 034 984 A2 | 9/2000 |
| EP | 1 111 336 A1 | 6/2001 |
| WO | WO 00/44580 A1 | 8/2000 |

\* cited by examiner

*Primary Examiner*—Gertrude A. Jeanglaude
(74) *Attorney, Agent, or Firm*—Sughrue Mion

(57) ABSTRACT

A navigation system for a movable body is provided with: a current position detection device (2) for detecting a current position of a movable body; a map information presentation device (3) for presenting map information corresponding to the detected current position; a route condition information presentation device (4) for presenting route condition information indicating a current condition of a route on which the movable body is driving; and a driving route presentation device (6) for performing a presentation indicating that the movable body can overtake, in case that the movable body on the route can overtake on the basis of the presented map information and the presented route condition information.

46 Claims, 9 Drawing Sheets

NAVIGATION SYSTEM AND NAVIGATION METHOD FOR MOVABLE BODY, PROGRAM STORAGE DEVICE AND COMPUTER DATA SIGNAL EMBODIED IN CARRIER WAVE

BACKGROUND OF THE INVENTION

1. Field of the Invention

The present invention relates to a navigation system for a movable body such as an on-vehicle navigation system or the like, a navigation method for a movable body, a program storage device and a computer data signal embodiment in a carrier wave, especially to those which are preferably used for an electronically controlled or computerized movable body having an apparatus for detecting biological information or an ACC (Adaptive Cruise Control) apparatus and so on.

2. Description of the Related Art

Nowadays, research and development on electronic control for controlling a drive of a vehicle are advanced, and a navigation system for aiding in driving is significantly spread and popularized.

As an example of this electronic control of a drive of a vehicle, there is what is referred to as the ACC. This is intended to detect a leading vehicle (i.e., another vehicle moving ahead of a self-vehicle) by millimeter wave radar, control an accelerator and a brake, hold a vehicle speed and a following distance or a distance between two vehicles, and decelerate or stop automatically depending on the behavior of the leading vehicle on a crowded road. There is also another type of ACC, which may have such a function that generates an alert sound or display a warning in the case that the following distance becomes shorter than a predetermined distance. Namely, the ACC function judges a driving condition of the leading vehicle and allows an automatic drive regarding the vehicle speed and the following distance, so that it can relieve a driver's driving burden. Moreover, the ACC function makes it possible to drive in a comfortable driving condition set by a driver in the case that there is no leading car.

The navigation system for aiding in driving is designed to display map data, current position data, data of route to a destination, various types of guidance data, and the like on a display device or to output as voice or sound a warning message, a guidance message, or the like for navigation by a speaker mounted on the vehicle. The current position data are obtained by a GPS (Global Positioning System) apparatus, or by a self-contained or built-in positioning apparatus such as an angular velocity sensor, an acceleration sensor, a velocity sensor or the like (i.e. various types of measurement apparatuses for a traditional SCN (Self-Contained Navigation)) to obtain position information, either or both of which are mounted on a vehicle. Moreover, a communication navigation system, on which some development are now making progress, is equipped with a wireless communication device and is designed to aid in driving by exchanging radio messages with an outer information source and by catching objective information to display it or to output it as voice or sound.

However, the behavior of a vehicle that is automatically controlled is sometimes different from a driving condition that a driver expects. For example, in the case of following a low-speed leading vehicle on a blind road that gives a poor visibility such as a mountain path or the like, even if the following distance is held by the ACC, the uncertainty of when a driver can overtake the leading car gives him or her mental stress.

Moreover, in the case of encountering traffic congestion or jams, a driver usually receives stress mentally and/or physically. In this case, the driver desires to escape from the traffic congestion; however, there is hardly any device for aiding or helping the driver's desire, i.e. there is hardly any system that judges a surrounding condition and automatically presents information on overtakability such as whether or not it is overtakable (i.e., whether or not the self-vehicle is able to "overtake" the leading vehicle); if there is an overtakable point, where it is; how long it will take to reach the point; and so on.

As described above, according to an existing ACC and navigation system, there is such a problem that in the case a driver is feeling stressed to a low-speed leading vehicle or the like, it is difficult to present information indicating it is safely overtakable, even if a vehicle can do that in view of an actual road condition or road rules etc.

SUMMARY OF THE INVENTION

It is therefore an object of the present invention to provide a navigation system and a navigation method for a movable body, a program storage device and a computer data signal embodiment in a carrier wave, which can make a comprehensive judgment from various pieces of information related to driving such as a congested or jammed condition of a road on which the vehicle is now driving, a geographical or legal condition of a road, a biological condition of a driver, a driving condition of a vehicle, or the like for example and which can present information indicating that it is overtakable (i.e., a self-vehicle can overtake a leading vehicle) with respect to a driver at an appropriate time.

The above object of the present invention can be achieved by a navigation system for a movable body provided with: a current position detection device for detecting a current position of a movable body; a map information presentation device for presenting map information corresponding to the detected current position; a route condition information presentation device for presenting route condition information indicating a current condition of a route on which the movable body is driving; and a driving route presentation device for performing a presentation indicating that the movable body can overtake, in case that the movable body on the route can overtake on the basis of the presented map information and the presented route condition information.

According to the navigation system for a movable body of the present invention, when a movable body such as a vehicle or the like is driving, the current position detection device such as a self-contained positioning apparatus, a GPS apparatus or the like detects a current position of the movable body. Then, by the map information presentation device, the map information corresponding to the detected current position is presented, and by the route condition information presentation device, the route condition information indicating a current condition of a route on which the movable body is driving is presented.

In the map information presentation device, such information is recorded as a road environment required for driving such as a drive map or the like and a driving condition, for example, a limited speed, the number of traffic lane, an overtakable zone, or the like. The map information presentation device presents the map information with respect to a predetermined range with a designated position as a center. Regarding the designation of the position, an instruction by a driver may be inputted, or instead of this, a current position of the movable body e.g., the self-vehicle measured by the above-mentioned current position detection device may be automatically inputted.

On the other hand, the route condition information presentation device presents the information such as a traffic congestion condition (i.e., a traffic jam condition) of a road on which the movable body is now driving, a driving speed, an elapsed time length of congestion, a predicted time of relieving the congestion, and whether or not it is an overtakable area. For example, an operation condition of the ACC, an image analysis of a photography apparatus mounted on a vehicle, the route condition information such as wireless information or the like such as VICS (Vehicle Information Communication System) information emitted from a road administrator, or the like is presented.

Then, in case that the movable body can overtake (e.g., overtake another movable body or leading movable body ahead of the movable body on the same route) on the basis of the presented route condition information and the presented map information associated with the route on which the movable body is now driving as presented above, the driving route presentation device performs the presentation indicating that the movable body can overtake. Therefore, depending on the route condition such as a traffic congestion condition and a presence of a leading vehicle etc., which is presented as the route condition information, and the map information which includes road data or the like such as a geological condition such as a curve of a road and which includes a legal condition of no-overtaking zone or the like presented as the map information, if the movable body can actually overtake, an operator such as a driver or the like can perform overtaking safely and comfortably according to the presentation by the driving route presentation device. On the contrary, depending on the presented map information and the presented route condition information associated with the route such as a road on which the movable body is now driving, if the movable body cannot actually overtake, the operator such as a driver or the like does not have to perform overtaking unreasonably. The driving route presentation device, for example may present an overtaking traffic lane if it is overtakable, and it may present a traffic lane where a vehicle is now driving if it is not overtakable. Alternatively, if it will be overtakable after elapsing a predetermined time length, the information indicating it will be overtakable with this certain condition may be presented to the driver. In this case, regarding a concrete presentation indicating that it will be overtakable, sound or audio information and/or image information indicating that it will be overtakable may be outputted through a display and a speaker of an AV system mounted on a vehicle, for example.

As described above, in the case of encountering a traffic congestion or in the case of following a low-speed movable body, a timely transmission of overtaking information to a driver can support a safety driving without psychological pressure. Even if it is uncertain whether or not a road on which the movable body is now driving is allowed to overtake, an extremely effective system is designed to confirm this.

In one aspect of the navigation system of the present invention, the route condition information presentation device includes a forward detection device for detecting a presence of another movable body which is present ahead of the movable body and outputting a detection result thereof as one of the route condition information, and a presentation by the map information presentation device, a presentation by the route condition information presentation device, and the presentation by the driving route presentation device are performed if such a condition that the presence of the another movable body is detected by the forward detection device is met as one of required conditions for these presentations.

According to this aspect, if there is another movable body, which is a leading vehicle for example, ahead of a movable body, the forward detection device detects this presence of another movable body and outputs the detection result as one of the route condition information. Then, if such a condition that the presence of the another movable body is detected is met, the presentation by the map information presentation device and the presentation by the route condition information presentation device are performed. Further, the presentation by the driving route presentation device is performed on the basis of the presented route condition information and the presented map information. Namely, if another movable body is not detected, it is not necessary to overtake, so that the presentation by the map information presentation device, the presentation by the route condition information presentation device or the presentation by the driving route presentation device is not performed.

In this aspect, the forward detection device may include a camera with which pictures of a view ahead of the movable body are taken.

By constituting in this manner, by taking pictures of a view ahead of the movable body with a camera such as a compact camera, a CCD camera, or the like, it is possible to detect another movable body such as a leading vehicle or the like.

Alternatively, in this aspect, the navigation system may be further provided with: a driving condition detection device for detecting a driving condition of the movable body; and an ACC apparatus for controlling a drive of the movable body on the basis of the detected driving condition, wherein the forward detection device may be included in the ACC apparatus.

By constituting in this manner, it is possible to detect another movable body such as a leading vehicle or the like by the forward detection device such as a millimeter wave radar or the like included in the ACC apparatus while automatically controlling a drive of the movable body with the ACC apparatus.

Incidentally, the ACC apparatus is intended to detect a leading vehicle by a millimeter wave radar, to control an accelerator and a brake to hold a vehicle speed or a following distance, and to decelerate or stop depending on how the leading vehicle drives on a crowded road, automatically. It may generate an alert sound or display the warning if the following distance becomes shorter than a predetermined distance to relieve a driver's driving burden and to aim highly safe and effective driving of a vehicle. In addition to these basic functions, such other functions that assist driver's driving may be added.

In another aspect of the navigation system of the present invention, the navigation system is further provided with: a driving condition detection device for detecting a driving condition of the movable body; and an ACC apparatus for controlling a drive of the movable body on the basis of the detected driving condition, wherein the presentation by the driving route presentation device is performed if such a condition that a driving condition supposed to recommend overtaking set in advance is detected by said driving condition detection device is met as one of required conditions for the presentation.

According to this aspect, if there is detected a driving condition supposed to recommend overtaking set in advance, e.g. a driving condition of a vehicle which is following a leading vehicle if a vehicle speed of the leading vehicle is extremely slow or is slow compared to a legal speed limit, by the driving condition detection device such as a millimeter wave radar, a vehicle speed sensor, or the like, for example, while automatically controlling a drive of the movable body with the ACC apparatus, the presentation by the driving route presentation device is performed on the basis of the presented map information and the presented map information.

In another aspect of the navigation system of the present invention, the route condition information presentation device includes a biological information detection device for detecting biological information on an operator of the movable body and outputting a detection result thereof as one of the route condition information, and a presentation by the map information presentation device, a presentation by the route condition information presentation device and the presentation by the driving route presentation device are performed if such a condition that biological information supposed to recommend overtaking set in advance is detected by the biological information detection device is met as one of required conditions for the presentation.

According to this aspect, the biological information detection device detects the physical and mental biological information on an operator and outputs the detection result as one of the route condition information.

The biological information detection device associated with the present invention is intended to have a structure to detect a physical and mental physiological condition of the driver who is now driving the movable body. For example, in the case that he or she encounters a traffic congestion while driving and is required to continue driving under the condition, e.g. under the ACC control, for a long time, the driver suffers enormous stress physically and mentally. Continuing driving under this condition is of a problem considering safety, so that if the condition allows, it is preferable to perform an overtaking operation and advance the movable body forward.

For this purpose, it is required to know an operator's physical or mental biological condition and if it becomes a predetermined standard or more, it is required to recommend overtaking. As the biological information, the following is used: a pulse rate, a perspiration, a skin resistance, a respiration, a heart rate, a heart rate valiability or the like. A change of these biological information, which is found when an operator's "extent of irritation" is high, is set in advance as the biological information supposed to recommend overtaking. This kind of setting is performed experimentally, experientially, theoretically, simulationally, or the like, and the biological information supposed to recommend overtaking may be fixed, or it may be variable with a default value being fixed.

Then, if such a condition that biological information supposed to recommend overtaking is detected by the biological information detection device is met, the presentation by the map information presentation device and the presentation by the route condition information presentation device are performed. Further, the presentation by the driving route presentation device is performed on the basis of the presented map information and the presented route condition information. Namely, if it is not detected the biological information supposed to recommend overtaking, the necessity of overtaking is low, so that the presentation by the map information presentation device, the presentation by the route condition information presentation device or the presentation by the driving route presentation device is not performed In this aspect, the biological information detection device detects a physical and mental physiological condition of the operator by at least one of a pulse rate, a perspiration, a skin resistance, a respiration, a heart rate and a heart rate variability.

By constituting in this manner, by a pulse rate, a perspiration, a skin resistance, a respiration, a heart rate and a heart rate variability or by a combination of arbitrary two or more of these, it becomes possible to detect a physical and mental physiological condition of the operator relatively easily even if he or she is in the movable body or is maneuvering.

In another aspect of the navigation system of the present invention, the map information includes information on geographical feature of a road on which the movable body drives.

According to this aspect, if it is overtakable on the basis of the information on geographical feature such as a road inclination, the ups and downs, road curvature and so on, it is possible to perform the presentation indicating that it is overtakable by the driving route presentation device. Therefore, it becomes possible to operate a safe and ensure overtaking depending on geographical feature.

In this aspect, the information on geographical feature includes information on a road inclination and a radius of curvature of a forward road on which the vehicle drives.

By constituting in this manner, it becomes possible to perform the presentation indicating that it is overtakable by the driving route presentation device in case that it is judged to be overtakable on the basis of the information on the road inclination of the forward road (i.e. information indicating whether it is up or down, or information indicating how steep it is) and the information on the radius of curvature of the forward road (i.e. information indicating a condition of a curve where the movable body will advance), both of which are important information to judge whether or not it is appropriate to overtake a leading vehicle. For example, if the curve is sharp and the inclination is large, it is judged not appropriate to overtake at the point.

In another aspect of the navigation system of the present invention, the map information includes information on an overtakable zone of a road on which the movable body drives.

According to this aspect, it becomes possible to perform the presentation indicating that it is overtakable by the driving route presentation device in case that it is judged to be overtakable on the basis of the decisive information indicating whether or not the area is allowed to overtake, road-administratively or according to road rules.

In another aspect of the navigation system of the present invention, the map information includes information on a legal speed limit of a road on which the movable body drives.

According to this aspect, it becomes possible to perform the presentation indicating that it is overtakable by the driving route presentation device in case that it is judged to be overtakable on the basis of the decisive information indicating whether or not it is overtakable a leading vehicle within the legal speed limit or whether or not the vehicle now is observing the legal speed limit of the road, by road rules.

In this aspect, the presentation by said driving route presentation device is performed if such a condition that the movable body can overtake at or under the legal speed limit is met as one of required conditions for the presentation.

By constituting in this manner, if it is overtakable at or under the legal speed limit, the presentation by the driving route presentation device is performed on the basis of the presented map information and the presented route condition information. Namely, if it is not overtakable at or under the legal speed limit, the presentation by the driving route presentation device is not performed.

In another aspect of the navigation system of the present invention, the navigation system is further provided an input device capable of inputting request information indicating a request for overtaking from an operator of the movable body, wherein a presentation by the map information presentation device, a presentation by the route condition information presentation device, and the presentation by the driving route presentation device are performed if such a condition that the request information is inputted by said input device is met as one of required conditions for the presentations.

According to this aspect, the request information indicating the request for overtaking is inputted through the input device by an audio or sound input operation, a key operation, a button operation, or the like, for example. Then, the presentation by the map information presentation device and the presentation by the route condition information presentation device are performed, and further, the presentation by the driving route presentation device are performed on the basis of the presented map information and the presented route condition information. Namely, if the operator does not express his or her positive will, it is not necessary to overtake, so that the presentation by the map information presentation device, the presentation by the route condition information presentation device, or the presentation by the driving route presentation device is not performed.

In another aspect of the navigation system of the present invention, the driving route presentation device performs the presentation including at least one of a overtakable point, a distance to the overtakable point, a predicted time length to the overtakable point, and a predicted time of passing through the overtakable point.

According to this aspect, if it is judged to be overtakable on the basis of the presented map information and the presented route condition information, the driving route presentation device performs the presentation including at least one of a overtakable point, a distance to the overtakable point, a predicted time length to the overtakable point, and a predicted time of passing by the overtakable point. The predicted time length and the predicted time are easily calculated from information on the distance to the overtakable point and a vehicle speed. Moreover, in case that overtaking is forbidden due to a road construction, a traffic accident, or the like, it is possible to present, to a driver, a time length until a cancellation of the forbiddance or a time at the cancellation, by catching forbiddance cancellation information emitted from a road administrator. In any case, the overtaking information is transmitted to a driver in advance, so that it can support a safety driving without psychological pressure.

In another aspect of the navigation system of the present invention, the driving route presentation device includes: a judgment device for judging whether or not the movable body can overtake on the route on the basis of the presented map information and the presented map information; and an output device for outputting to an external portion the information indicating that the movable body can overtake in case that it is judged that the movable body can overtake by the judgment device.

According to this aspect, it is judged whether or not the movable body can overtake on the route by the judgment device on the basis of the map information and the route condition information, when they are presented. Then, the output device such as an audio output device and/or a display device or the like outputs to the external portion the information indicating that it is overtakable in case that it is judged to be overtakable. As this kind of output device, it is also possible to use a display and/or a speaker of an AV (Audio-Visual) system mounted on a vehicle.

In another aspect of the navigation system of the present invention, the navigation system is further provided with: an input device capable of inputting a destination; and a route searching device for searching for a route to the destination ahead of the movable body on the basis of the detected current position and the presented map information.

According to this aspect, when inputting a destination through the input device, the route searching device searches for a route to the destination ahead of the movable body on the basis of the current position and the map information. Therefore, it becomes possible to perform the presentation indicating that it is overtakable by the driving route presentation device, with respect to the searched route.

In this aspect, the driving route presentation device may be constructed to perform the presentation indicating that the movable body can overtake on the basis of the map information associated with the searched route.

By constituting in this manner, the presentation indicating that it is overtakable can be performed effectively on the basis of the map information associated with the searched route. Especially, it is advantageous in the case that the overtakable position is located relatively far and is located ahead of an intersection or is located after turning the intersection.

In another aspect of the navigation system of the present invention, the navigation system is provided with: a fixed unit which is not mounted on the movable body; and a movable body unit which is mounted on the movable body, both of which are mutually connected through a communication device, wherein the map information presentation device, the route condition information presentation device, and the driving route presentation device are disposed in the fixed unit at least partially.

According to this aspect, it is possible to establish the navigation system by disposing on the side of a movable body unit, a portion for detecting the current position, a portion for detecting the route condition information, a portion for outputting as voice or sound the presentation indicating that it is overtakable, a portion for displaying with image the presentation indicating it is overtakable or the like, as well as by disposing the rest portionson the side of a fix unit, which is connected to this movable unit through the communication device and which is, for example, provided with a server device or the like. Consequently, the burden associated with the judgment operation of whether or not it is overtakable, the database of the map information, or the like, can be imposed on the side of the fix unit, so that it is possible to simplify an apparatus structure of the movable unit mounted on each movable body and to decrease the operational burden thereon.

The above object of the present invention can be achieved by a navigation method for a movable body provided with: a current position detection process of detecting a current position of a movable body; a map information presentation process of presenting map information corresponding to the detected current position; a route condition information presentation process of presenting route condition information indicating a current condition of a route on which the movable body is driving; and a driving route presentation process of performing a presentation indicating that the movable body can overtake in case that the movable body on the route can overtake on the basis of the presented map information and the presented route condition information.

According to the navigation method for a movable body of the present invention, in the same manner as the above-mentioned navigation system of the present invention, in the case of encountering a traffic congestion and in the case of following a low-speed vehicle, a timely transmission of overtaking information to a driver can support a safety driving without psychological pressure. Even if it is uncertain whether or not a road on which the movable body is now driving is allowed to overtake, an extremely effective system is designed to confirm this.

The above object of the present invention can be achieved by a program storage device readable by a computer in a navigation system for a movable body for tangibly embodying a program of instructions which cause the computer to function as: a current position detection device for detecting a current position of a movable body; a map information presentation device for presenting map information corresponding to the detected current position; a route condition information presentation device for presenting route condition information indicating a current condition of a route on which the movable body is driving; and a driving route presentation device for performing a presentation indicating that the movable body can overtake in case that the movable body on the route can overtake on the basis of the presented map information and the presented route condition information.

According to the program storage device, such as a CD-ROM (Compact Disc-Read Only Memory), a DVD-ROM (DVD Read Only Memory), a hard disk, a flexible disk or the like, of the present invention, the map information presentation device, the route condition information presentation device, and the driving route presentation device, all of which are constituting the above-described navigation system of the present invention, can be relatively easily realized as a computer reads and executes the program of instructions or as it executes the program after downloading the program through a communication device. Especially, the program of instructions in this kind may be executed by a computer mounted on the movable body or by a computer which is not mounted on the movable body but connected to it through a communication device.

The above object of the present invention can be achieved by a computer data signal embodied in a carrier wave and representing a series of instructions which cause a computer in a navigation system for a movable body to function as: a current position detection device for detecting a current position of a movable body; a map information presentation device for presenting map information corresponding to the detected current position; a route condition information presentation device for presenting route condition information indicating a current condition of a route on which the movable body is driving; and a driving route presentation device for performing a presentation indicating that the movable body can overtake in case that the movable body on the route can overtake on the basis of the presented map information and the presented route condition information.

According to the computer data signal embodied in the carrier wave of the present invention, as the computer downloads the program in the computer data signal through a computer network or the like, and executes this program, it is possible to realize the map information presentation device, the route condition information presentation device, and the driving route presentation device, all of which are constituting the above-described navigation system of the present invention. Especially, the program of instructions in this kind may be executed by a computer mounted on the movable body or by a computer which is not mounted on the movable body but connected to it through a communication device.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained. Each embodiment, which will be described below, is intended to apply the navigation system for a movable body of the present invention to an on-vehicle navigation system.

(I) First Embodiment

Firstly, a navigation system for a movable body of the first embodiment will be explained with reference to FIG. 1 to FIG. 5. Incidentally, a "biological condition sensor 15" shown in FIG. 1 is used in the second embodiment, which will be explained later, and is not used in the explanation of the first embodiment.

Figure 1:
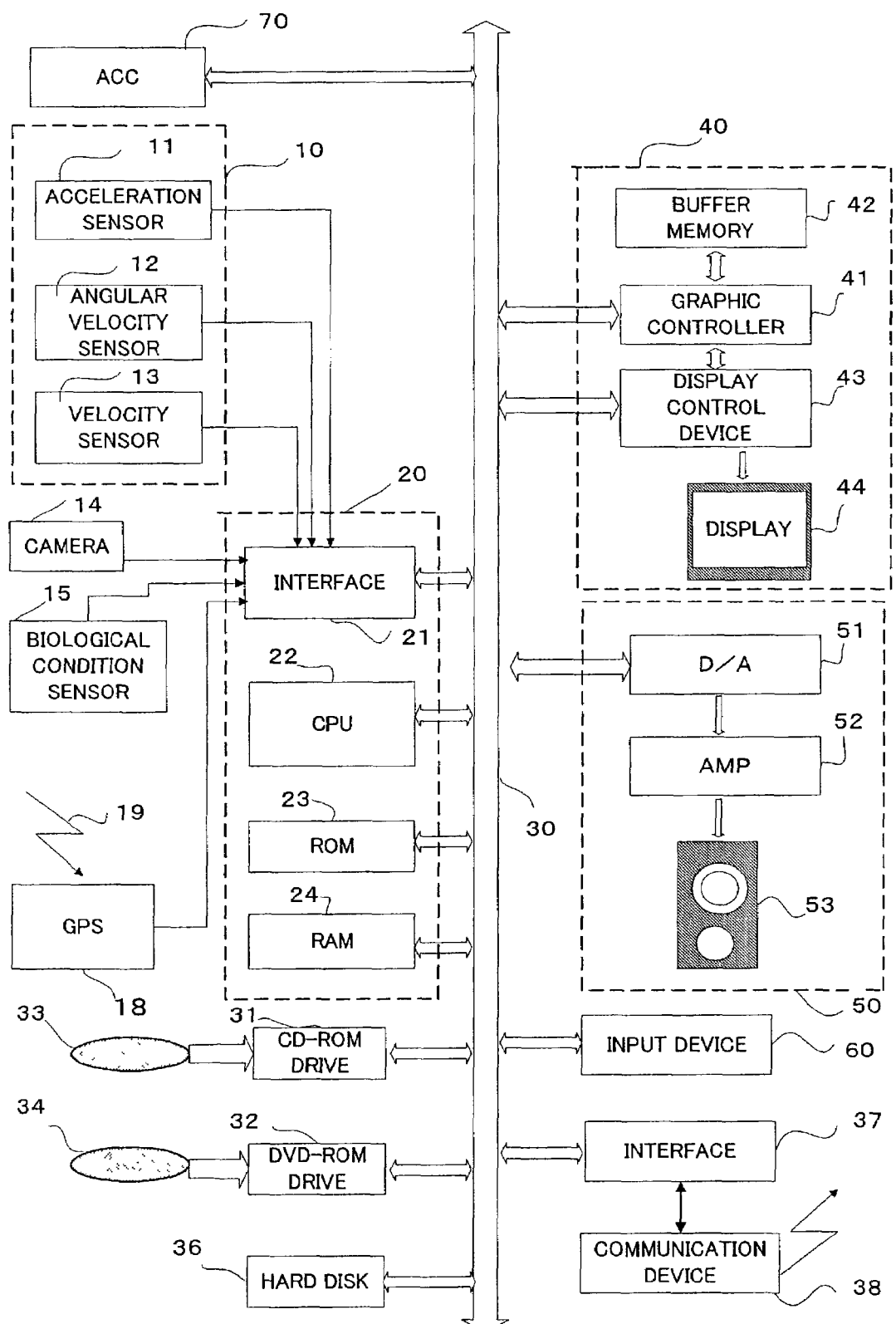
FIG. 1 is a block diagram showing a navigation system for a movable body associated with a first embodiment and a second embodiment of the present invention.

As shown in FIG. 1, the navigation system for a movable body in the first embodiment is provided with a self-contained positioning apparatus 10, a camera 14, a GPS receiver 18, a system controller 20, a CD-ROM drive 31, a DVD-ROM drive 32, a hard disk unit 36, an interface 37 for communication, a communication device 38, a display unit 40, an audio output unit 50, an input device 60, and an ACC apparatus 70.

The self-contained positioning apparatus 10 is constructed to include an acceleration sensor 11, an angular velocity sensor 12, and a velocity sensor 13. The acceleration sensor 11, which is constructed by a piezoelectric element, for example, detects an acceleration of a vehicle and outputs acceleration data. The angular velocity sensor 12, which is constructed by a vibration gyro, for example, detects an angular velocity of a vehicle when a direction of the vehicle is changed and outputs angular velocity data and relative azimuth data. The velocity sensor 13 detects the rotation of a vehicle shaft mechanically, magnetically, or optically and is constructed by a vehicle speed sensor, which generates a vehicle speed pulse as a pulse signal at every rotation for a predetermined angle around the vehicle shaft.

The camera 14 is intended to take pictures of a vicinity of a vehicle such as ahead of a vehicle to understand surrounding circumstances in which the vehicle lies, and a CCD camera using a CCD image pickup element is preferable to use due to its small size. Moreover, it is also possible to share an image pickup device attached to the ACC apparatus 70.

The GPS receiver 18 is intended to be used for detection of an absolute position of a vehicle from information on latitude, longitude, or the like and it is a part to receive a radio wave 19, which carries down link data including data for positioning or measuring from a plurality of GPS satellites. It is used to know a present location of a vehicle, as is the case with the self-contained positioning apparatus 10.

The system controller 20 includes an interface 21, a CPU (Central Processing Unit) 22, a ROM (Read Only Memory) 23 and a RAM (Random Access Memory) 24 and is constructed to control the whole system.

The interface 21 performs an interface operation with the acceleration sensor 11, the angular velocity sensor 12, the velocity sensor 13, the camera 14, and the GPS receiver 18. From them respectively, it inputs into the system controller 20 vehicle speed data, the acceleration data, the angular velocity data, the relative azimuth data, GPS measurement data, absolute azimuth data, image data of surroundings etc.

The CPU 22 has such a function that judges information to be presented to a driver on the basis of inputted various data, prepares the information, and presents the information, as well as controlling the whole system controller 20.

The ROM 23 has a not-illustrated non-volatile memory or the like where a control program etc. for controlling the system controller 20 is stored. The RAM 24 readably stores various types of data such as route data, which are set in advance by a user through the input device 60, and the like and supplies a working area to the CPU 22.

The system controller 20, the CD-ROM drive 31, the DVD-ROM drive 32, the hard disk unit 36, the interface 37 for communication, the display unit 40, the audio output unit 50, the input device 60, and the ACC apparatus 70 are mutually connected through a bus line 30.

The CD-ROM drive 31 and the DVD-ROM drive 32 read a control program corresponding to each embodiment and various types of data such as road data etc. including a legal speed limit, the presence or the absence of overtaking lanes, road width, the number of traffic lanes, and the like from a CD-ROM 33 and a DVD-ROM 34 respectively and then output them under the control of the system controller 20

Moreover, under the control of the system controller 20, the CD-ROM drive 31 and the DVD-ROM drive 32 may have such a function that reads out audio data and video data as contents information from the CD-ROM 33 and the DVD-ROM 34, respectively.

Incidentally, it is possible to dispose either one of the CD-ROM drive 31 and the DVD-ROM drive 32, and it is also possible to dispose a CD and DVD compatible drive.

The hard disk unit 36 regularly or occasionally stores map data, which are read from the CD-ROM drive 31 or the DVD-ROM drive 32 and which corresponds to position information of a vehicle in motion measured by the GPS receiver 18 etc. Alternatively, it stores the audio data and the video data, which are read from the CD-ROM drive 31 or the DVD-ROM drive 32, as the contents information. This makes it possible to read out and output to play the contents stored in the CD-ROM 33 or the DVD-ROM 34 while reading out the map information stored in the hard disk unit 36. Alternatively, this makes it possible to read out the map information stored in the CD-ROM 33 or the DVD-ROM 34 while reading out and outputting to play the contents information stored in the hard disk unit 36. Moreover, it is possible to store the video information from the camera 14 in the hard disk unit 36 at the same time and to read out and output them in order to provide various pieces of information for navigation and assist information indicating that it is overtakable, as will be described later as the occasion demands. Furthermore, it is also possible to regularly or occasionally store road information received with the communication device 38 from a road administrator into the hard disk unit 36 and to read out and output them in order to provide the various pieces of information for navigation and the assist information indicating that it is overtakable, as will be described later as the occasion demands.

The communication device 38 is constructed by a cellar phone, for example, and is equipped with such a function that can download the audio data, the video data, the map data, or the like, or predetermined types of data regarding those data through the interface 37 for communication, which constitutes a modem or the like.

The display unit 40 displays the above-described various types of display data under the control of the system controller 20. The display unit 40 is provided with: a graphic controller 41, which controls the whole of the display unit 40 on the basis of control data transmitted from the CPU 22 through the bus line 30; a buffer memory 42, which is constructed by a memory such as a VRAM (Video RAM) etc. and which temporarily memorizes immediately-displayable image information; a display control device 43, which controls the display of a display 44 such as a compact LCD (Liquid Crystal Device), an EL (Electro-Luminescence) display, a CRT (Cathode Ray Tube), or the like on the basis of image data outputted from the graphic controller 41; and the display 44. The display 44 is constructed by a liquid crystal display device etc. on the order of 5 to 10 inches in diagonal length, for example, and is installed around a front panel inside the vehicle. The assist information by an image to a driver, which is judged and prepared at CPU 22, is displayed on the display 44.

The audio output unit 50 is provided with: a D/A (Digital to Analog) converter 51, which performs a D/A conversion of sound digital data transmitted through the bus line 30 from the CD-ROM drive 31, the DVD-ROM 32, or the RAM 24 etc. under the control of the system controller 20; an amplifier (AMP) 52, which amplifies a sound analog signal outputted from the D/A converter 51; and a speaker 53, which converts the amplified sound analog signal to voice or sound and which outputs it into the vehicle. The assist information as voice or sound to a driver, which is judged and prepared at the CPU 22, is outputted from this speaker 53.

The input device 60 is provided with a key, a switch, a button, a remote controller, an audio input device, and so on, to input various types of commands and data.

Especially in this embodiment, a driver inputs a requirement instruction indicative of checking a congestion condition of roads and whether or not it is overtakable by operating the input device 60.

The input device 60 is preferably installed in the vicinity of the display 44 loaded in a vehicle in view of the convenience of operation.

Operational conditions of the ACC apparatus 70, as will be described below, are transmitted to the CPU 22 through the bus line 30, and the data are recorded into the RAM 24. The data from the ACC apparatus 70 are also provided to use as important judgment matter of the assist information that will be presented to a driver.

Figure 2:
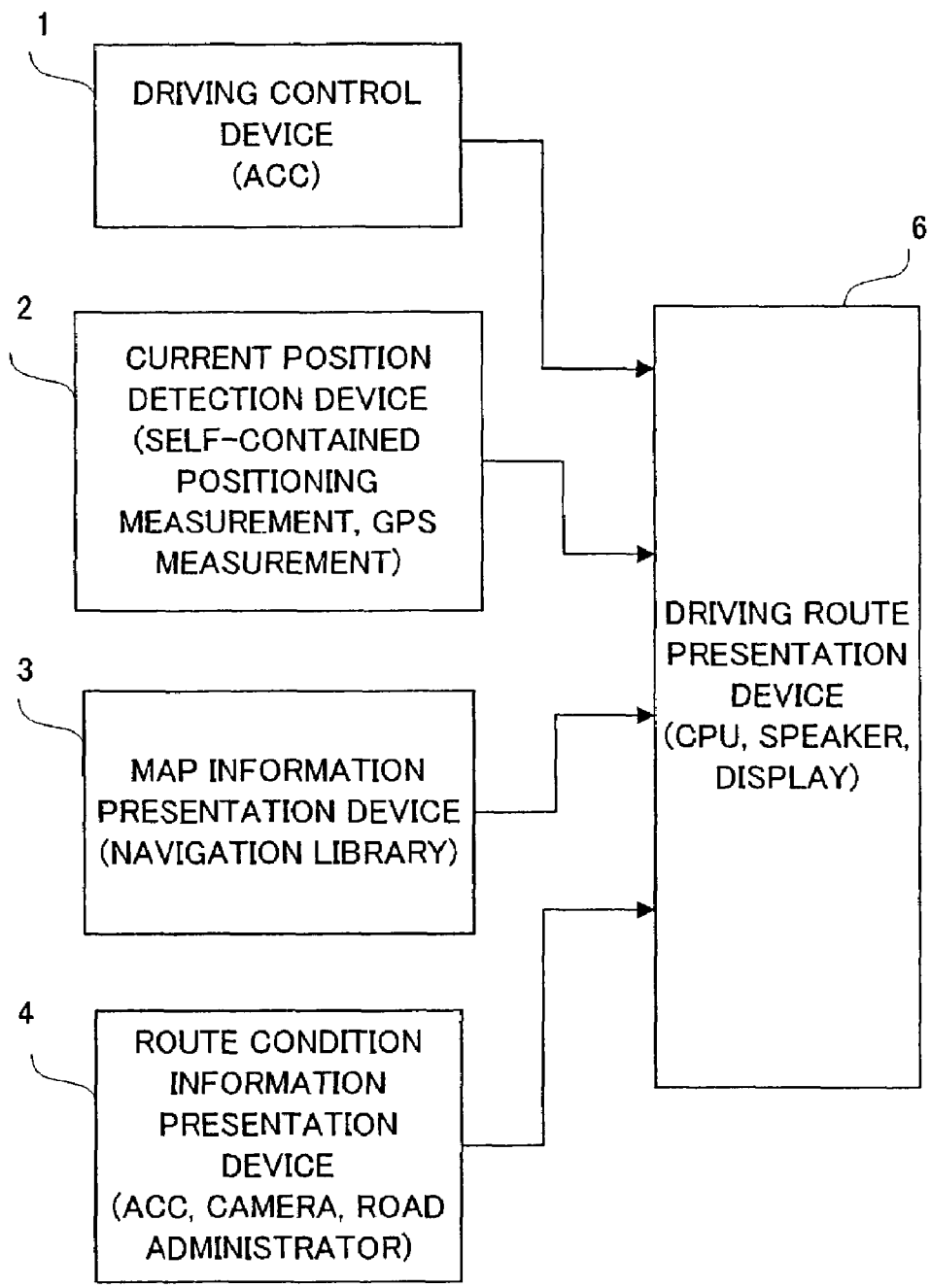
FIG. 2 is a schematic diagram showing constitutional devices and their concrete technical elements of the first embodiment.

As for the constitutional devices and their concrete technical elements of the first embodiment, as shown in FIG. 2, it is possible to use the ACC apparatus 70 shown in FIG. 1 or the like as a driving control device 1. As a current position detection device 2, it is possible to use the GPS receiver 18, the self-contained positioning apparatus 10, or the like. As a map information presentation device 3, it is possible to use a navigation library or the like which is stored in the hard disk unit 36, the CD-ROM 33, the DVD-ROM 34, or the like or which is accessible through the communication device 38. As a route condition information presentation device 4, it is possible to use the ACC apparatus 70, the camera 14, the communication device 38 for receiving road administrator information, or the like. As a device for generating the assist information or the like on the basis of various pieces of information among a driving route presentation device 6, it is possible to use the CPU 22. Moreover, as a device for presenting the assist information or the like to an external portion among the driving route presentation device 6, it is possible use the speaker 53, the display 44, or the like. If there are other appropriate technical elements, they can be obviously used as the occasion demands.

Next, the ACC apparatus 70 will be explained with reference to FIG. 3. The ACC apparatus, which stands for the Adaptive Cruise Control apparatus, is one of the techniques that take over Intelligent Transportation System (ITS) technique of vehicle's side. There is an ECU (Electronic Control Unit) 71 as a central processing device of the ACC apparatus 70, and it has a following distance calculation device 71a, a vehicle speed detection device 71b, a following distance control device 71c therein, for example.

As an information input device to the ECU 71, there are a millimeter wave radar 72, a vehicle speed sensor 73, an operation switch 74, a CCD camera 75, or the like, for example. On the other hand, there are an accelerator actuator 76, a brake actuator 77, an electronic power steering system (EPS) 78, an information unit 79, or the like on the output side.

Especially in this embodiment, the ACC apparatus 70, as shown in FIG. 1, is constructed as one portion of a navigation system for a movable body and is constructed such that the ECU 71 is connected to the bus line 30 to output information indicative of the presence or the absence of a leading vehicle, or the like.

The operations of the ACC apparatus 70, which has the above-mentioned function, are as follows. If the millimeter wave radar 72 detects a leading vehicle, the ACC apparatus 70 calculates a following distance to the leading vehicle at the following distance calculation device 71a from the information obtained at the vehicle speed sensor 73, or the like, obtains the vehicle speeds of the two vehicles at the vehicle speed detection device 71b, and controls to hold the constant following distance at the following distance control device 71c on the basis of those data. To perform this driving control, an output from the ECU 71 is transmitted to the accelerator actuator 76, the brake actuator 77, the EPS 78, or the like. The information such as the instruction to the driver, the operation condition, the driving condition or the like is outputted to the information unit 79.

Moreover, the input by the driver such as a certain operational instruction, an operation cancellation, or the like can be performed with the operation switch 74. Furthermore, if image information ahead of the vehicle is required for the input, it is possible to use images taken by the CCD camera 75.

On the other hand, if there is hardly any vehicle ahead, i.e. if a leading vehicle is not detected by the millimeter wave radar 72, it is possible to drive automatically at a comfortable speed set by a driver. This setting can be performed with the operation switch 74.

Figure 3:
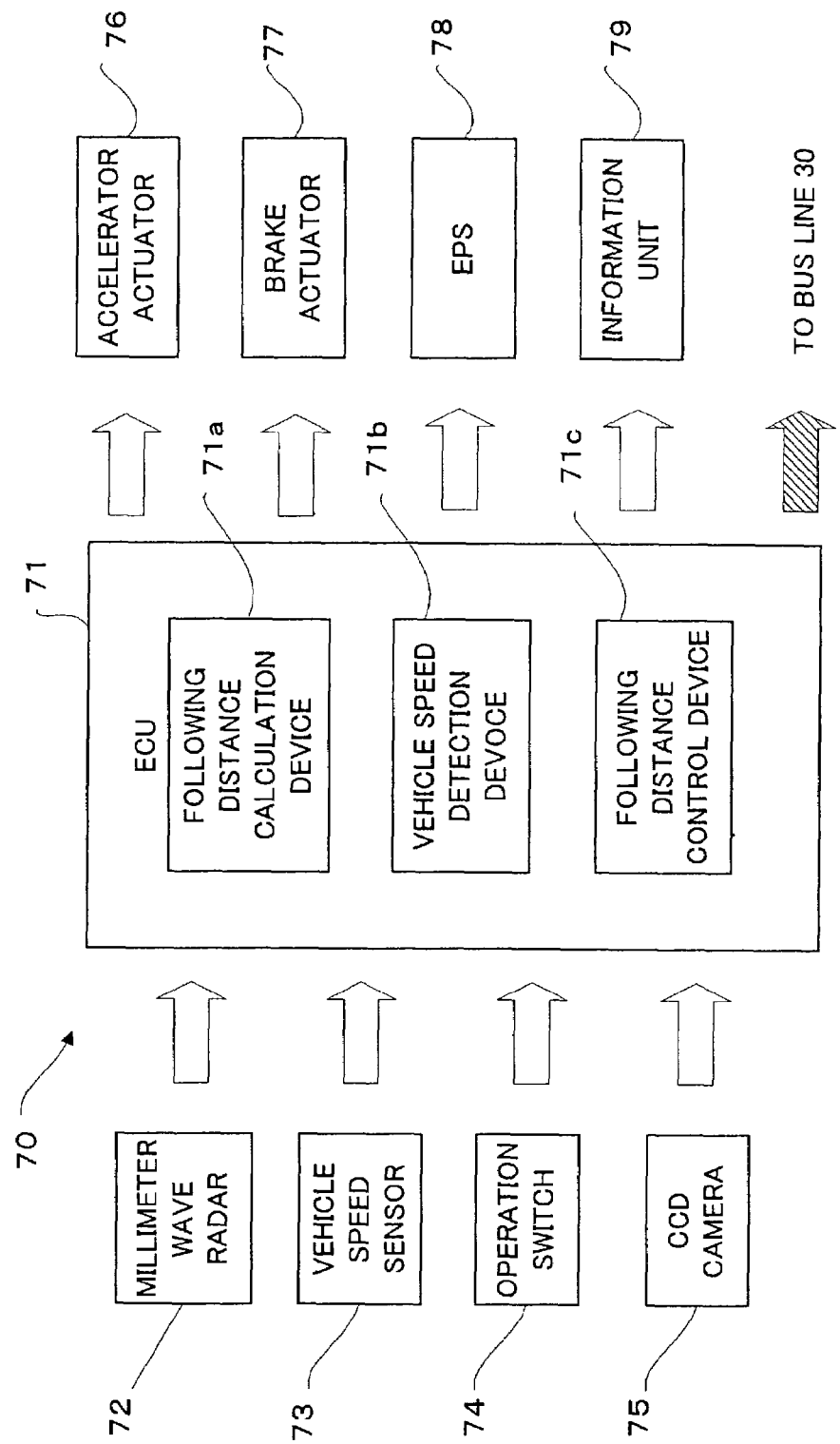
FIG. 3 is a block diagram showing a structure of an ACC system associated with the first embodiment.

Incidentally, the vehicle speed sensor 73 shown in FIG. 3 and the vehicle speed sensor 13 constituting the self-contained positioning apparatus 10 shown in FIG. 1 are shareable with each other. The operation switch 74 shown in FIG. 3 and the input device 60 shown in FIG. 1 are shareable with each other. The CCD camera shown in FIG. 3 and the camera 14 shown in FIG. 1 are shareable with each other.

Data processing in the first embodiment as constructed above and the second embodiment as will be described below is intended to be executed mainly at the CPU 22 shown in FIG. 1. More concretely, a computer program for presentation of the assist information indicating that it is overtakable in response to the output from a biological information detection circuit or the like, as will be described below, and from the ACC apparatus 70 is intended to be executed mainly at the CPU 22 in addition to a computer program for controlling a basic operation in a navigation system such as display of a route, a current position, a map, or the like. Especially, this kind of data processing associated with presentation of the assist information indicating that it is overtakable is intended to be executed regularly or occasionally by an interrupt processing or the like as one portion of a main navigation program.

Figure 4:
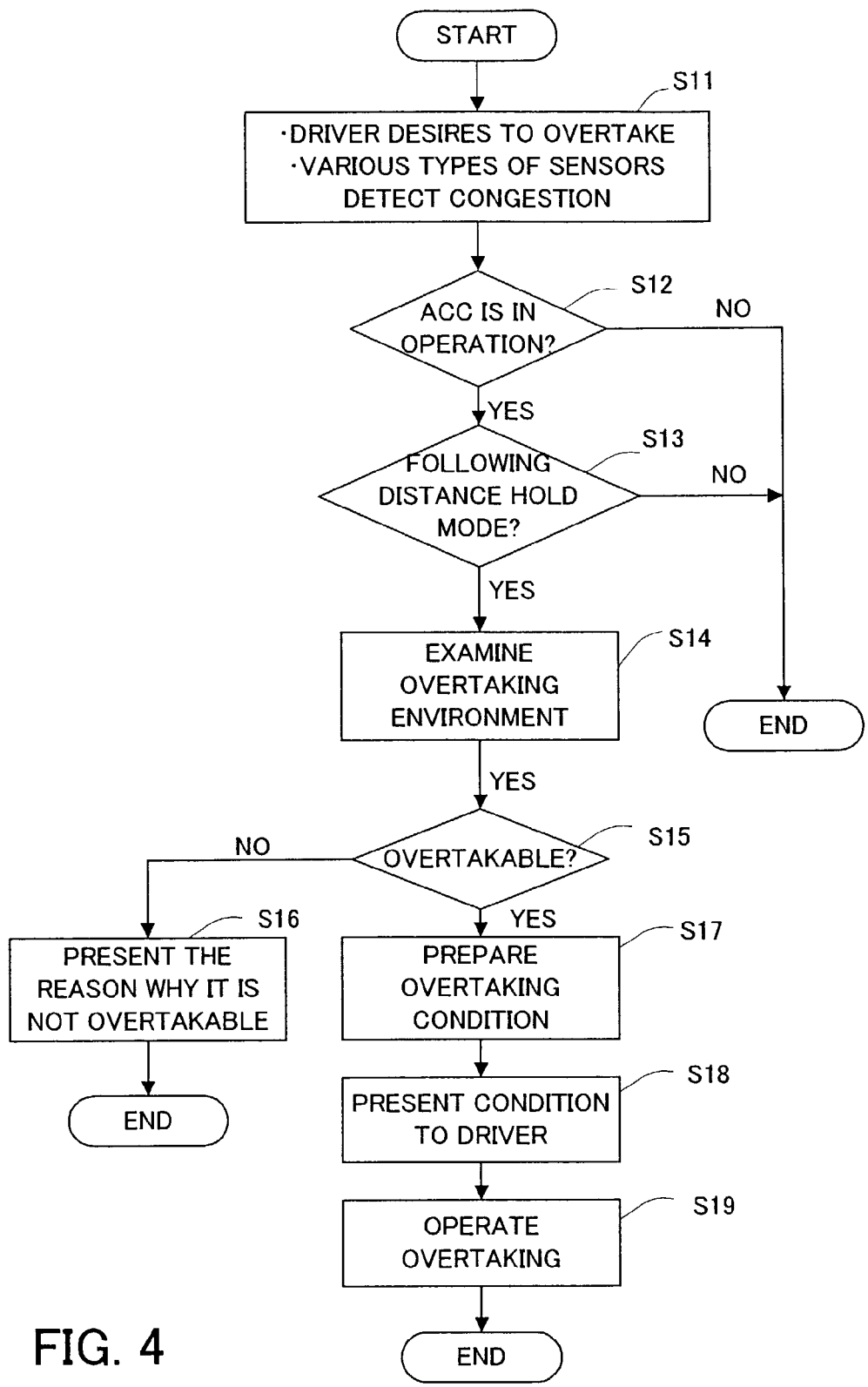
FIG. 4 is a flow chart showing an operational flow of the first embodiment.

Next, an operational flow associated with the presentation of the assist information indicating that it is overtakable in the first embodiment will be mainly explained with reference to a flow chart in FIG. 4. Incidentally, the control shown in FIG. 4 is performed by executing a computer program, in which the control content is described, mainly at the CPU 22 shown in FIG. 1. This kind of computer program may be stored in the ROM 23, the CD-ROM 33, or the DVD-ROM 34, or may be what is downloaded to the hard disk unit 36, the RAM 42, or the like through the communication device 38. In the explanation below, such a condition is assumed that a vehicle equipped with the ACC apparatus 70 drives on an expressway or the like as a case of using the navigation system for a movable body.

In FIG. 4, the input, which indicates a driver's desire to overtake, is firstly performed through the operation switch 74 by the driver, or a traffic congestion is detected by various types of sensors (step S11). Then, it is confirmed whether or not the ACC apparatus 70 is in operation (step S12). If the ACC apparatus 70 is not in operation (step S12: NO), the operational flow is ended without change. If the ACC apparatus 70 is in operation (step S12: YES), that means the vehicle is driven while obeying a following distance, a vehicle speed, or the like, which are set in advance. As long as the driver does not cancel this, the vehicle is restrained by the control of the ACC apparatus 70.

Then, it is confirmed whether or not the vehicle is driven in a following distance hold mode (step S13). If it is not the following distance hold mode (step S13: NO), the operational flow is ended without change. If it is the following distance hold mode (step S13: YES), that means there is another vehicle ahead and the vehicle is driven while ensuring a predetermined following distance.

Then, it is studied or examined to judge whether or not it is possible to overtake under the road environment (step S14).

Items, devices, and the like for this study or examination are considered as follows. Firstly, it is necessary to know a current position of the vehicle, so that the current position is measured by the GPS receiver 18 or the like. Secondly, it is compared to a map library stored in the hard disk unit 36 or the like to know a topographical condition of the position. This topographical condition includes information on geographical features of the road on which the vehicle is now driving, and more concretely, it includes information on a road inclination, the radius of curvature of a forward road or the like, for example.

The radius of curvature of a forward road indicates a curve condition of a location where the vehicle will advance soon, while the road inclination indicates whether it is up or down and how steep it is. They are important information to judge whether or not the position is appropriate to overtake a vehicle. According to a predetermined standard, if the curve is sharp and the inclination is large, it is not appropriate to overtake at the point, and they are used as a judgment matter of the overtaking operation as well as the other information. Moreover, information on when a road becomes a road shape appropriate to overtake if the vehicle keeps driving is also important and it is collected.

The map library also includes information on no-overtaking zone by road rules and searches for whether or not the current position is within the zone where the overtaking is allowed, and if not allowed, searches for where the zone on which it is overtakable is ahead of the self-vehicle.

The map library also includes information on a legal speed limit of each zone. If it is such a condition that the vehicle cannot overtake unless it exceeds the legal speed limit, it is desirable that the system judges it not-overtakable and notifies the driver of that.

Sometimes, an actual condition is different from the information registered in the map library due to certain circumstances of the time and the zone themselves; for example, trip restriction or the like by a traffic accident or by construction. In the embodiment, it may be possible to catch, for example, wireless information such as VICS (Vehicle Information Communication System) information or the like emitted from a road administrator and to use it as information for judgment. As for the condition caused by a traffic accident and construction, it is usually possible to assume its cancellation time and its cancellation zone, or it is often notified. This kind of information is also important as a judgment matter, because it is possible to know when it becomes possible to overtake.

On the basis of results of the survey searching as described above, it is judged whether or not it is overtakable (step S15). This judgment includes presentation of judgment in such a format that the overtaking is not allowed now but from when and on which zone it can be performed in the future. It is obviously presumable to present to a driver such a judgment that it is not overtakable as a result of examining various conditions. However, in this case, i.e. in the case that it is judged not-overtakable in the step S15 (step S15: NO), the reason why it is not overtakable is presented to the driver (step S16).

On the other hand, in the case that it is judged overtakable in the step S15 (step S15: YES), an overtaking condition such as a speed, a traffic lane, an overtaking place, or the like is surveyed and confirmed (step S17), and it is presented to the driver (step S18). More concretely, the assist information indicating that it is overtakable is presented to the driver, with these conditions included, by an image and voice or sound through the audio output unit 50 and/or the display unit 40. Then, if the driver accepts overtaking to be performed under the presented condition, he or she starts an overtaking operation. More concretely, he or she stops the ACC that is in operation by an operation of the accelerator or the like (step S19). Incidentally, if it is necessary to elapse a predetermined period for the overtaking, the driver performs the overtaking operation after elapsing it.

Next, a series of operations in the first embodiment as described above will be further explained with reference to a sequence chart in FIG. 5. The sequence chart shows a mutual relationship with time among four constitutional elements, i.e. an operation of the driver, various sensors, a control device including the CPU, and a mechanical element. The horizontal lines show the mutual relationship and the vertical lines, which direct up to down, show time elapsing. Incidentally, step numerals are common to both FIG. 5 and a flow chart shown in FIG. 4, and it is possible to contrast it with the flow chart in FIG. 4.

Figure 5:
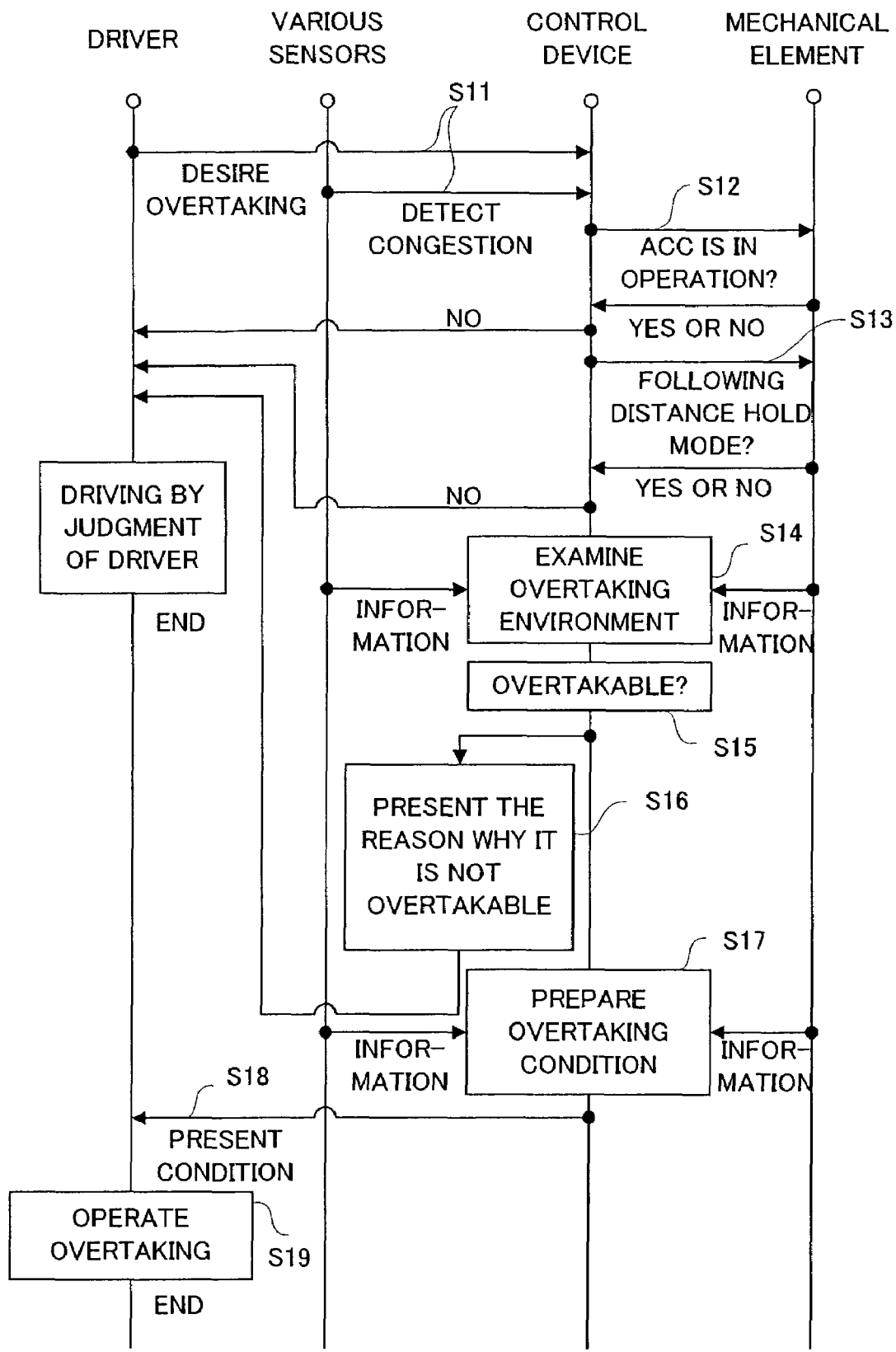
FIG. 5 is a sequence chart showing a mutual relationship of system elements of the first embodiment with time.

In FIG. 5, if a driver desires to overtake, or if the various sensors detect the traffic congestion (step S11), it is examined whether or not the ACC is in operation (step S12) and whether or not it is in the following distance hold mode (step S13) with respect to a predetermined mechanical element from the control device. If the ACC is not in operation, the driver can drive without any restriction by the ACC.

If the ACC is in operation, information is collected from the mechanical element and the various sensors and an overtaking environment is studied or examined (step S14). The control device judges whether or not it is overtakable on the basis of this information (step S15), if not possible, that is presented to the driver with a reason (step S16). Moreover, if possible, the overtaking condition, e.g. an overtaking place, an overtaking speed, a traffic lane, or the like is determined on the basis of the examined information and if the predetermined time elapsing is necessary, its condition is also determined (step S17), and then they are presented to the driver (step S18). If the driver accepts the condition, he or she starts the overtaking operation according to the condition (step S19).

In the case of encountering the traffic congestion while driving according to the ACC on an expressway or in the case of following a low-speed leading vehicle on a mountain path, for example, a diver desires to overtake it to escape that situation as quickly as possible. As described above, according to the navigation system for a movable body in the first embodiment of the present invention, it is possible to respond this desire safely and immediately. Even if it is not possible to overtake immediately, the presentation of the information indicating it is overtakable later can satisfy a driver, to thereby prevent him or her from operating dangerously. Moreover, even if it is not possible to overtake, the presentation of the reason can satisfy and calm down a driver.

Incidentally, related to the navigation system for a movable body in the first embodiment as described above, such a condition is assumed that a vehicle equipped with the ACC function drives; however, it is not limited to this and it may be easily constructed as a navigation system for a movable body which is not equipped with the ACC function. Namely, in the explanation with reference to FIG. 4 and FIG. 5, even if there are not the step S12 or the step S13, the present invention still functions substantially. For example, the steps after the step S14 may be performed in the same manner after taking pictures of a view ahead with the camera 14 shown in FIG. 1 and detecting the presence of a leading vehicle by the system controller 20 or the like, for example. Moreover, the steps after the step S14 may be performed in the same manner after confirming a leading vehicle by a visual observation of the driver and after inputting through the input device 60 or the like information indicating that a leading vehicle is present.

(II) Second Embodiment

Figure 6:
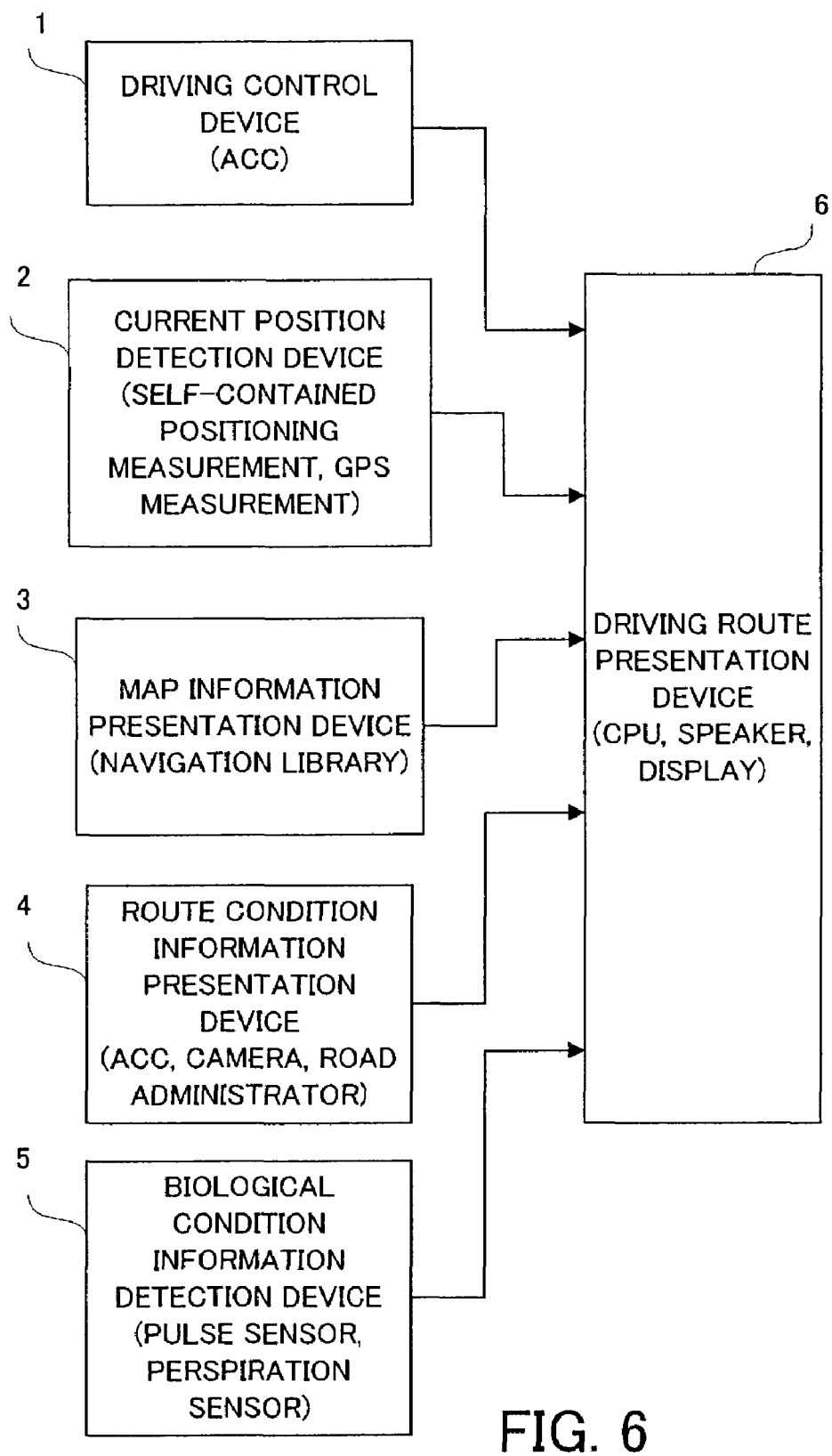
FIG. 6 is a schematic diagram showing constitutional devices and their concrete technical elements of the second embodiment.
Figure 7:
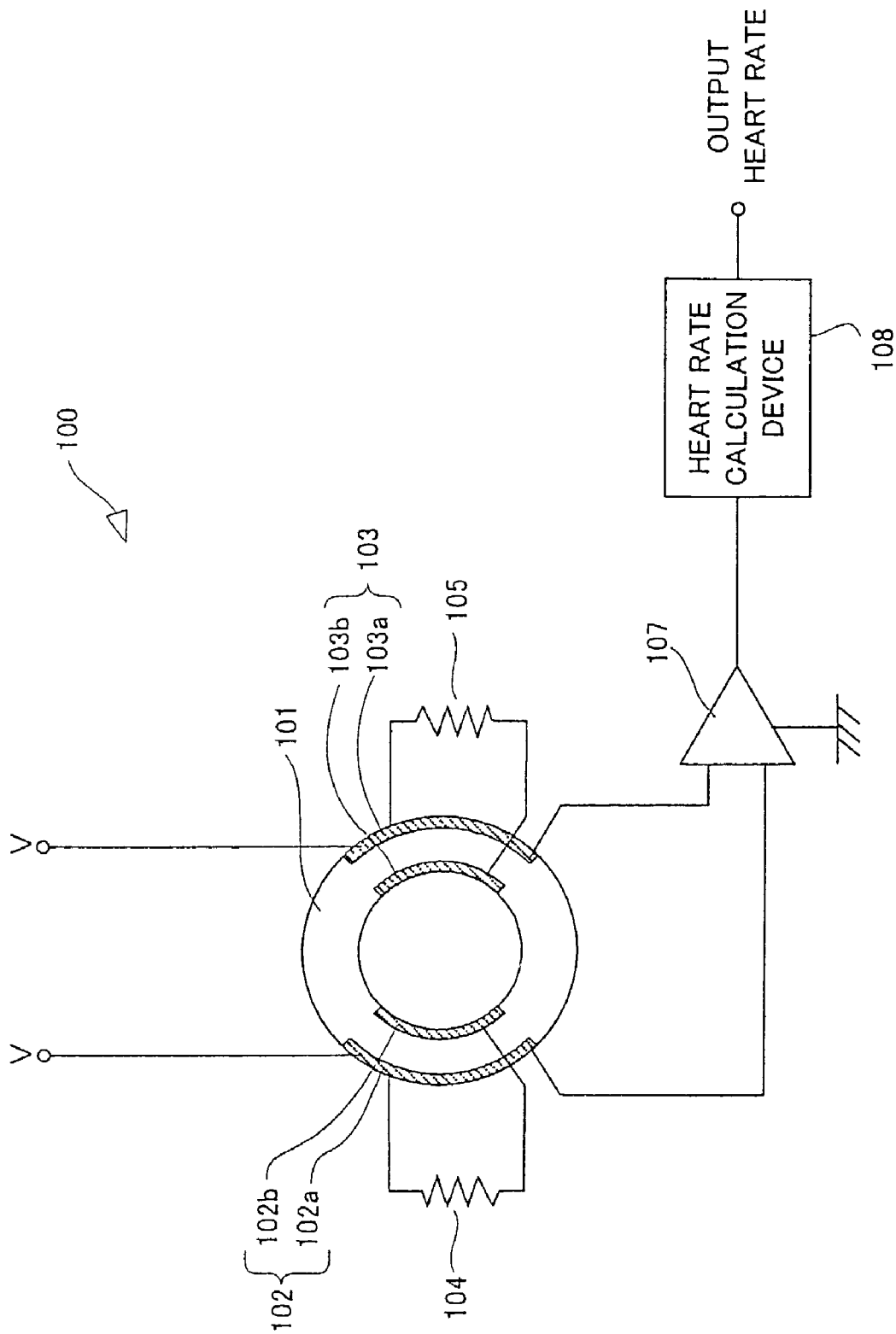
FIG. 7 is one example of a measurement structure to obtain biological information used in the second embodiment.
Figure 8:
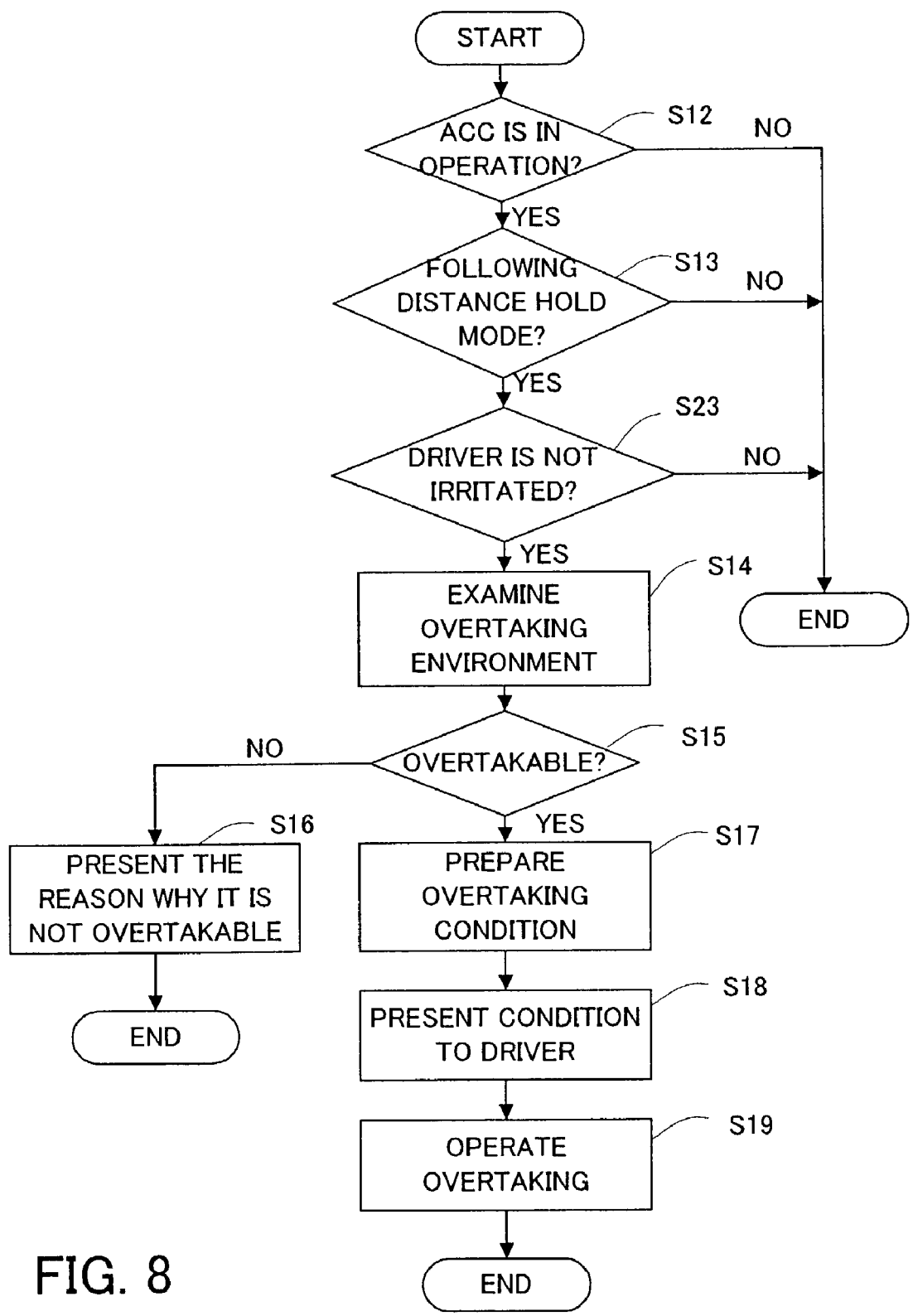
FIG. 8 is a flow chart showing an operational flow of the second embodiment.
Figure 9:
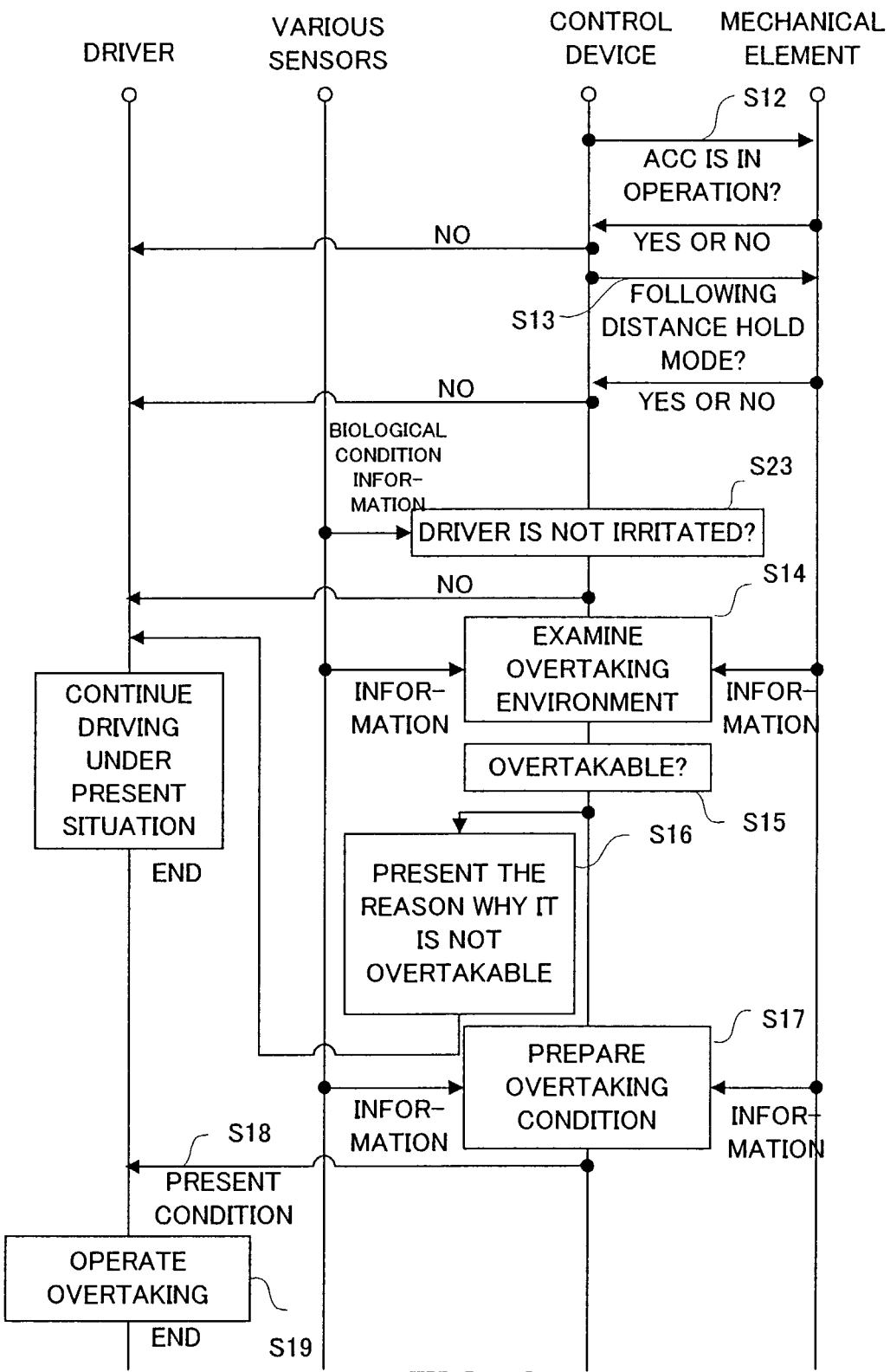
FIG. 9 is a sequence chart showing a mutual relationship of system elements of the second embodiment with time.

Next, a navigation system for a movable body in the second embodiment will be explained with reference to FIG. 1 and with reference to FIG. 6 to FIG. 9. FIG. 1 is a block diagram of a navigation system for a movable body. FIG. 6 is a schematic diagram showing constitutional devices and their concrete technical elements. FIG. 7 is one example of a measurement structure to obtain biological information. FIG. 8 is a flow chart showing an operational flow. FIG. 9 is a sequence chart showing a mutual relationship of system elements with time.

Incidentally, the "biological condition sensor 15" shown in FIG. 1 is characteristically used in the second embodiment and is a basic constitutional element of the second embodiment. Therefore, what is associated with the biological condition will be focused on and explained. Other relating apparatuses will be referred to the explanations in the first embodiment as the occasion demands, and a re-explanation is omitted here.

As shown in FIG. 1, the navigation system for a movable body in the second embodiment is provided with the self-contained positioning apparatus 10, the camera 14, the biological condition sensor 15, the GPS receiver 18, the system controller 20, the CD-ROM drive 31, the DVD-ROM drive 32, the hard disk unit 36, the interface 37 for communication, the communication device 38, the display unit 40, the audio output unit 50, the input device 60, and the ACC apparatus 70.

The interface 21 performs an interface operation with the biological condition sensor 15 in addition to the acceleration sensor 11, the angular velocity sensor 12, the velocity sensor 13, the camera 14, and the GPS receiver 18. From them respectively, it inputs into the system controller 20 biological condition data in addition to the vehicle speed data, the acceleration data, the relative azimuth data, the angular velocity data, the GPS measurement data, the absolute azimuth data, the image data of surroundings etc.

The biological condition data are stored into the hard disk unit 36 through the interface 21. The hard disk unit 36 stores the map data and the like, which are read from the CD-ROM drive 31 or the DVD-ROM drive 32 and which corresponds to position information of a vehicle in motion measured by the GPS receiver 18 etc. Moreover, video information from the camera 14 is recorded at the same time.

These stored various data are read out to provide navigation information such as display of a route to a destination, display of a current position mark on a neighboring map or the like or especially to provide the assist information indicating that it is overtakable, both of which are for aiding in driving by a driver as the occasion demands. In this case, road information from a road administrator received by the communication device 38 can be stored into the hard disk unit 36 sequentially in the same manner and can be used when preparing the above-described assist information and navigation information.

As for the constitutional devices and their concrete technical elements of the second embodiment, as shown in FIG. 6, it is possible use the ACC apparatus 70 or the like shown in FIG. 1 as a driving control device 1. As a current position detection device 2, it is possible to use the self-contained positioning device 10, the GPS receiver 18, or the like. As a map information presentation device 3, it is possible to use a navigation library or the like which is stored in the hard disk unit 36, the CD-ROM 33, the DVD-ROM 34, or the like or which is accessible through the communication device 38. As a route condition information presentation device 4, it is possible to use the ACC apparatus 70, the camera 14, the communication device 38 receiving road administrator information, or the like. As a biological information detection device 5, it is possible to use the biological condition sensor 15 or the like such as a perspiration sensor or a pulse sensor, as will be described below. As a device for generating the assist information or the like on the basis of various pieces of information among a driving route presentation device 6, it is possible to use the CPU 22, and further as a device for presenting the assist information or the like to outside among the driving route presentation device 6, it is possible to use the speaker 53, the display 44, or the like. If there are other appropriate technical elements, they can be obviously used as the occasion demands.

Next, the biological information will be explained. FIG. 7 is one example of an apparatus for obtaining the biological information by detecting electric potential difference, an electrically-conductive condition between electrodes caused by grabbing a steering wheel, or the like.

Firstly, the structure and the operation of a biological information detection circuit 100 will be explained. The biological information detection circuit 100 may be constructed as the biological condition sensor 15 in FIG. 1. Alternatively, the biological information detection circuit 100 may be constructed as (i) the biological condition sensor 15 and (ii) one portion of the system controller 20, into which an output signal of the biological condition sensor 15 is inputted and which analyzes this output signal, or the like in FIG. 1.

In FIG. 7, electrodes 102a and 102b and electrodes 103a and 103b, which are separated into an outer side and an inner side, are disposed on the left and right sites of a steering wheel 101, where a driver puts his or her hands. By grabbing the left site, a left hand skin resistance 104 is inserted between the electrodes 102a and 102b constituting an electrode 102 for a left hand. By grabbing the right site, a right hand skin resistance 105 is inserted between the electrodes 103a and 103b constituting an electrode 103 for a right hand. Electric potentials at the electrodes 102a and 103a are separately inputted into a differential amplifier 107. Then, the electric potential difference between the both electrodes is amplified by the differential amplifier 107 to limit a frequency band, so that an electrocardiogram signal is outputted. This electrocardiogram signal is inputted into a heartbeat calculation device 108. Heart rate is obtained on the basis of this output.

Incidentally, the detection of the electrocardiogram may be constructed to measure heartbeat of the driver by using what is called a pulse wave, which detects a peripheral blood flow volume in a hand that is putted on the steering wheel, by an optical sensor set on a steering wheel unit, or by analyzing a phase difference between an irradiation signal and its returned signal after irradiating a heart with a weak microwave by a high-frequency circuit installed into a seatbelt or the like.

Heart rate usually increases in a state of tension or irritation or distraction. By judging a change of the condition from this electrocardiogram, it becomes possible to estimate a driver's mental condition. Moreover, a method of analyzing and estimating a spectral change of a variable component of a heart interval may be used. Furthermore, by checking a skin electric reaction (different from the electrocardiogram) between a right hand and a left hand or perspiration by a skin electric resistance, it is possible to know the biological condition. It also becomes possible to grasp the more accurate biological condition of a driver in combination with a skin electric reaction indicative of a temporary tension. In addition, it is obvious that such a technique that can obtain the biological information may be used as the occasion demands, other than the above-mentioned techniques.

Next, an operational flow in the second embodiment as constructed above will be explained with reference to a flow chart of FIG. 8. The control shown in FIG. 8 is performed by executing a computer program, in which the control content is described, mainly at the CPU 22 shown in FIG. 1. This kind of computer program may be stored in the ROM 23, the CD-ROM 33, or the DVD-ROM 34, or may be what is downloaded to the hard disk unit 36, the RAM 42, or the like through the communication device 38. Incidentally, the same steps in FIG. 8 as those in the first embodiment in FIG. 4 carry the same numerals and their explanations are omitted as the occasion demands.

In FIG. 8, the step S12 and the step S13 are firstly performed. In the second embodiment, however, the step S11 of the first embodiment is not performed, and a series of operations is started independently from the detection of the traffic congestion and the driver's desire to overtake.

As a result of the judgment in the step S13, if it is in the following distance hold mode (step S13: YES), that means there is another vehicle ahead and the vehicle is driven while ensuring a predetermined following distance. Driving under this kind of condition as described above may adversely affects the driver physically or mentally and may raise concerns about his or her drive operation.

Accordingly, next, the driver's physical or mental biological condition is checked to confirm instability in a living body such as whether or not a driver is irritated or the like (step S23). More concretely, it is judged whether or not a detection value of the biological information described with reference to FIG. 7 or a secondary indication value obtained from the detection value exceeds a predetermined threshold value. Then, if it does not exceed the predetermined threshold value, it is considered that a driver does not have any particular complaints about the current drive (step S23: NO), and the operational flow is ended without change. Incidentally, the predetermined threshold value for performing this judgment can be set in advance experimentally, experientially, theoretically, simulationally, or the like. It may be fixed or it may be variable with a default value being fixed.

If the instability in a living body is a predetermined level or more (step S23: YES), the safety of driving is concerned and worried, so that the operational flow moves to the examination of whether or not it is possible to overtake under the road environment (step S14) and the step S15 to the step S19 are subsequently performed in the same manner as those of the first embodiment.

Incidentally, when presenting the reason why it is not overtakable in the step S16, an additional presentation of a biological situation to a driver may be performed to call his or her attention. For example, it is possible to output as voice or sound a message such as "Be calm" or the like at the audio output unit 50.

Next, a series of operations in the second embodiment as described above will be explained with reference to a sequence chart in FIG. 9. The sequence chart shows a mutual relationship with time among four constitutional elements, i.e. an operation of the driver, various sensors, a control device including the CPU, and a mechanical element. A horizontal line shows the mutual relationship, and the vertical line, which directs up to down, shows time elapsing. Incidentally, step numerals are common to both FIG. 9 and a flow chart shown in FIG. 8, and it is possible to contrast it with the flow chart in FIG. 8.

In FIG. 9, it is examined whether or not the ACC is in operation (step S12) and whether or not it is in the following distance hold mode (step S13) with respect to a predetermined mechanical element from the control device. If the ACC is in operation and driver's driving is restricted, the driver's physical and mental biological condition is checked on the basis of information on a biological information sensor to confirm instability in a living body such as whether or not a driver is irritated or the like (step S23). When the control device judges that the instability in a living body is a predetermined level or more, information is collected from the various sensors and the mechanical element to examine an overtaking environment (step S14).

At the control device, it is judged whether or not it is overtakable on the basis of these information (step S15), and if not possible, the condition is shown to the driver (step S16), and the driving is continued without change. On the other hand, if possible, the overtaking condition, e.g. an overtaking place, an overtaking speed, a traffic lane, or the like, is determined on the basis of the results of examining, and if a predetermined time is necessary, its condition is determined (step S17), and then they are presented to the driver (step S18). If the driver accepts the condition, he or she starts the overtaking operation according to the condition (step S19).

In the case of encountering the traffic congestion while driving according to the ACC system on the expressway or in the case of following a low-speed leading vehicle on a mountain path, for example, a driver's physical and mental instability increases, which may raise concerns and worries about the safety of the driving. As described above, according to the navigation system for a movable body in the second embodiment of the present invention, the possibility to overtake is automatically examined and presentation to the driver can be performed including the overtaking condition, so that it is possible to ensure the safety of driving. Even if it is not possible to overtake immediately, the presentation of the information indicating it is overtakable later can satisfy the driver, to thereby prevent him or her from operating dangerously. Moreover, even if it is not possible to overtake, the presentation of the reason can satisfy and calm down the driver.

Incidentally, related to the navigation system for a movable body in the second embodiment as described above, such a condition is assumed that a vehicle equipped with the ACC function drives; however, it is not limited to this and it may be easily constructed as a navigation system for a movable body which is not equipped with the ACC function. Namely, in the explanation with reference to FIG. 8 and FIG. 9, even if there are not the step S12 or the step S13, the present invention still functions substantially. For example, the steps after the step S23 may be performed in the same manner after taking pictures of a view ahead with the camera 14 shown in FIG. 1 and detecting the presence of a leading vehicle by the system controller 20 or the like, for example. Moreover, the steps after the step S23 may be performed in the same manner after confirming the leading vehicle by a visual observation of the driver and inputting through the input device 60 or the like the information indicating that the leading vehicle is present.

In each embodiment as described above, the processing associated with the presentation of the assist information indicating that it is overtakable is executed in an on-vehicle navigation system. It is possible to execute the processing in this kind by using the communication device 38 in the on-vehicle navigation system and by communicating a server such as the Internet; namely, it is possible to construct it as what is called a communication navigation system. In this case, at least one portion of the map information presentation device 3, the route condition information presentation device 4, the driving route presentation device 6 or the like, which are constructed in the on-vehicle navigation system shown in FIG. 2 or FIG. 6, may be constructed on the server of the Internet. For example, the current position information, the route condition information, the biological information, or the like are transmitted to the server side through the communication device 38. According to this transmitted information, the server performs the above-mentioned various judgments, examination processing or the like, and then transmits therefrom the assist information indicating that it is overtakable on a forward scheduled route or on a road corresponding to a current position of the vehicle (namely, the assist information including the information indicating a place where it is overtakable or a time length for which it will take to become overtakable, or the assist information including the information indicating the reason why it is not overtakable). On the on-vehicle navigation system side, which received this assist information with the communication device 38, the received assist information is outputted by the audio output unit 50 and/or the display unit 40. In addition, as for the navigation functions associated with route guiding, route searching after inputting a destination, the presentation of a neighboring map of a current position, or the like, all of which are a basic navigation operation, it is possible to execute them while communicating the server by use of the communication device 38.

Moreover, the navigation system for a movable body of the present invention can be applied not only to one for a vehicle as described in each embodiment above, but one for various movable bodies such as a bicycle, a ship, an airplane or the like, or further to one for a pedestrian who uses a cellular phone, a portable or hand-carry type information terminal, or the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-245730 filed on Aug. 13, 2001 including the specification, claims, drawings and summary is incorporated herein by reference in its entirety.

What is claimed is:

1. A navigation system for a movable body comprising:
    a current position detection device for detecting a current position of a movable body;
    a map information presentation device for presenting map information corresponding to the detected current position;
    a route condition information presentation device for presenting route condition information indicating a current condition of a route on which the movable body is driving, said condition including a presence of another movable body which is present ahead of the movable body; and
    an overtaking information presentation device for performing a presentation indicating at least one information that the movable body can pass the another movable body, in case that the movable body on the route can pass the another movable body on the basis of the presented map information and the presented route condition information.

2. The navigation system according to claim 1, wherein said route condition information presentation device includes a forward detection device for detecting the presence of the another movable body and outputting a detection result thereof as one of the route condition information and
    a presentation by said map information presentation device, a presentation by said route condition information presentation device and the presentation by said overtaking information presentation device are performed if such a condition that the presence of the another movable body is detected by the forward detection device is met as one of required conditions for these presentations.

3. The navigation system according to claim 2, wherein the forward detection device includes a camera with which pictures of a view ahead of the movable body are taken.

4. The navigation system according to claim 2, further comprising:
    a driving condition detection device for detecting a driving condition of the movable body; and
    an ACC (Adaptive Cruise Control) apparatus for controlling a drive of the movable body on the basis of the detected driving condition,
    wherein the forward detection device is included in said ACC apparatus.

5. The navigation system according to claim 1, further comprising:
    a driving condition detection device for detecting a driving condition of the movable body; and
    an ACC apparatus for controlling a drive of the movable body on the basis of the detected driving condition,
    wherein the presentation by said overtaking information presentation device is performed if such a condition that a driving condition supposed to recommend passing set in advance is detected by said driving condition detection device is met as one of required conditions for the presentation.

6. The navigation system according to claim 1, wherein the map information includes information on geographical feature of a road on which the movable body drives.

7. The navigation system according to claim 6, wherein the information on geographical feature includes information on a road inclination and a radius of curvature of a forward road on which the vehicle drives.

8. The navigation system according to claim 1, wherein the map information includes information on a passable zone of a road on which the movable body drives.

9. The navigation system according to claim 1, wherein the map information includes information on a legal speed limit of a road on which the movable body drives.

10. The navigation system according to claim 9, wherein the presentation by said overtaking information presentation device is performed if such a condition that the movable body can pass at or under the legal speed limit is met as one of required conditions for the presentation.

11. The navigation system according to claim 1, further comprising an input device capable of inputting request information indicating a request for passing from an operator of the movable body, wherein a presentation by said map information presentation device, a presentation by said route condition information presentation device, and the presentation by said overtaking information presentation device are performed if such a condition that the request information is inputted by said input device is met as one of required conditions for the presentations.

12. The navigation system according to claim 1, wherein said overtaking information presentation device performs the presentation including at least one of a passable point, a distance to the passable point, a predicted time length to the passable point, and a predicted time of passing through the passable point.

13. The navigation system according to claim 1, wherein said overtaking information presentation device includes:

a judgment device for judging whether or not the movable body can pass on the route on the basis of the presented map information and the presented route condition information; and an output device for outputting to an external portion the information indicating that the movable body can pass in case that it is judged that the movable body can pass by the judgment device.

14. The navigation system according to claim 1, further comprising:

an input device capable of inputting a destination; and a route searching device for searching for a route to the destination ahead of the movable body on the basis of the detected current position and the presented map information.

15. The navigation system according to claim 14, wherein said overtaking information presentation device performs the presentation indicating that the movable body can pass on the basis of the map information associated with the searched route.

16. The navigation system according to claim 1, comprising: a fixed unit which is not mounted on the movable body; and a movable unit which is mounted on the movable body, both of which are mutually connected through a communication device, wherein said map information presentation device, said route condition information presentation device, and said overtaking information presentation device are disposed in said fixed unit at least partially.

17. The navigation system according to claim 1, wherein the presentation indicates whether or not the movable body can pass another movable body on the route.

18. A navigation system for a movable body comprising:

a current position detection device for detecting a current position of a movable body;

a map information presentation device for presenting map information corresponding to the detected current position;

a route condition information presentation device for presenting route condition information indicating a current condition of a route on which the movable body is driving; and an overtaking information presentation device for performing a presentation indicating at least one information that the movable body can pass another movable body, in case that the movable body on the route can pass the another movable body on the basis of the presented map information and the presented route condition information, wherein said route condition information presentation device includes a biological information detection device for detecting biological information on an operator of the movable body and outputting a detection result thereof as one of the route condition information, and a presentation by said map information presentation device, a presentation by said route condition information presentation device and the presentation by said overtaking information presentation device are performed if such a condition that biological information supposed to recommend passing set in advance is detected by the biological information detection device is met as one of required conditions for the presentation.

19. The navigation system according to claim 18, wherein the biological information detection device detects a physical and mental physiological condition of the operator by at least one of a pulse rate, a perspiration, a skin resistance, a respiration, a heart rate and a heart rate variability.

20. A navigation method for a movable body comprising:

a current position detection process of detecting a current position of a movable body;

a map information presentation process of presenting map information corresponding to the detected current position;

a route condition information presentation process of presenting route condition information indicating a current condition of a route on which the movable body is driving, said condition including a presence of another movable body which is present ahead of the movable body; and an overtaking information presentation process of performing a presentation indicating at least one information that the movable body can pass the another movable body in case that the movable body on the route can pass the another movable body on the basis of the presented map information and the presented route condition information.

21. The navigation method according to claim 20, wherein the presentation indicates whether or not the movable body can pass another movable body on the route.

22. The navigation method for a movable body as claimed in claim 20, wherein said route condition information presentation device includes a forward detection device for detecting the presence of the another movable body and outputting a detection result thereof as one of the route condition information, and wherein a presentation by said map information presentation device, a presentation by said route condition information presentation device and the presentation by said overtaking information presentation device are performed if such a condition that the presence of the another movable body is detected by the forward detection device is met as one of required conditions for these presentations.

23. A program storage device readable by a computer in a navigation system for a movable body for tangibly embodying a program of instructions which cause the computer to function as:

a current position detection device for detecting a current position of a movable body;

a map information presentation device for presenting map information corresponding to the detected current position;

a route condition information presentation device for presenting route condition information indicating a current condition of a route on which the movable body is driving, said condition including a presence of another movable body which is present ahead of the movable body; and an overtaking information presentation device for performing a presentation indicating at least one information that the movable body can pass the another movable body in case that the movable body on the route can pass the another movable body on the basis of the presented map information and the presented route condition information.

24. The program storage device according to claim 23, wherein the presentation indicates whether or not the movable body can pass another movable body on the route.

25. The program storage device as claimed in claim 23, wherein said route condition information presentation device includes a forward detection device for detecting the presence of the another movable body and outputting a detection result thereof as one of the route condition information, and wherein a presentation by said map information presentation device, a presentation by said route condition information presentation device and the presentation by said overtaking information presentation device are performed if such a condition that the presence of the another movable body is detected by the forward detection device is met as one of required conditions for these presentations.

26. A computer data signal embodied in a carrier wave and representing a series of instructions which cause a computer in a navigation system for a movable body to function as:

a current position detection device for detecting a current position of a movable body;

a map information presentation device for presenting map information corresponding to the detected current position;

a route condition information presentation device for presenting route condition information indicating a current condition of a route on which the movable body is driving, said condition including a presence of another movable body which is present ahead of the movable body; and an overtaking presentation device for performing a presentation indicating at least one information that the movable body can pass the another movable body, in case that the movable body on the route can pass the another movable body on the basis of the presented map information and the presented route condition information.

27. The computer data signal according to claim 26, wherein the presentation indicates whether or not the movable body can pass another movable body on the route.

28. The computer data signal as claimed in claim 26, wherein said route condition information presentation device includes a forward detection device for detecting the presence of the another movable body and outputting a detection result thereof as one of the route condition information, and wherein a presentation by said map information presentation device, a presentation by said route condition information presentation device and the presentation by said overtaking information presentation device are performed if such a condition that the presence of the another movable body is detected by the forward detection device is met as one of required conditions for these presentations.

29. A navigation system for a movable body, comprising:

a route condition information presentation device for presenting route condition information indicating a condition of a route on which the movable body is driving, said condition including a presence of another movable body which is present ahead of the movable body; and an overtaking information presentation device for performing a presentation indicating whether or not the movable body can pass another movable body based on the presented route condition information.

30. A communication navigation system according to claim 29, further comprising:

a map information presentation device for presenting map information corresponding to a position of the movable body, wherein said overtaking information presentation device performs the presentation based on the presented map information and the presented route condition information.

31. A communication navigation system according to claim 30, wherein said route condition information presentation device presents the route condition information indicating a current condition of the route on which the movable body is driving.

32. A communication navigation system according to claim 29, wherein said route condition information presentation device presents route condition information indicating a current condition of a route on which the movable body is driving.

33. A navigation system, comprising:

at least one sensor for sensing information; and a controller that determines whether or not a first mobile body can pass a second mobile body based on the information, wherein the sensor senses, as the information, a biological condition of a driver of the first mobile body.

34. The navigation system according to claim 33, wherein the sensor comprises at least one of an acceleration sensor, an angular velocity sensor, and a velocity sensor, and wherein the information comprises a current position of the first mobile body along a route.

35. The navigation system according to claim 33, wherein the sensor comprises a GPS, and wherein the information comprises a current position of the first mobile body along a route.

36. The navigation system according to claim 33, wherein the sensor comprises an optical sensing instrument that senses a relative location of the second mobile body to the first mobile body, and wherein the information comprises the relative location of the second mobile body.

37. The navigation system according to claim 36, wherein the optical sensing instrument comprises a camera that captures an image of the second mobile body.

38. The navigation system according to claim 33, wherein at least a portion of the navigation system is installed in the first mobile body.

39. The navigation system according to claim 33, wherein, when the controller determines that the first mobile body cannot pass the second mobile body, the controller outputs at least one control signal to prevent the first mobile body from passing the second mobile body.

40. The navigation system according to claim 33, wherein the information comprises a relative location of the second mobile body to the first mobile body and a road condition of a road on which the first mobile body is traveling.

41. The navigation system according to claim 40, wherein the information further comprises a biological condition of a driver of the first mobile body.

42. The navigation system according to claim 33, further comprising a display, wherein the display displays a message for the driver of the first mobile body indicating whether or not the first mobile body can pass the second mobile body.

43. A navigation system for a movable body comprising:
a current position detection device for detecting a current position of a movable body;
a map information presentation device for presenting map information corresponding to the detected current position;
a route condition information presentation device for presenting route condition information indicating a current condition of a route on which the movable body is driving, said condition including a presence of another movable body which is present ahead of the movable body; and
an overtaking information presentation device for presenting at least one information that the movable body can pass another movable body on the basis of the presented map information and the presented route condition information.

44. A navigation method for a movable body comprising:
a current position detection process of detecting a current position of a movable body;
a map information presentation process of presenting map information corresponding to the detected current position;
a route condition information presentation process of presenting route condition information indicating a current condition of a route on which the movable body is driving, said condition including a presence of another movable body which is present ahead of the movable body; and
an overtaking information presentation process of presenting at least one information that the movable body can pass another movable body on the basis of the presented map information and the presented route condition information.

45. A program storage device readable by a computer in a navigation system for a movable body for tangibly embodying a program of instructions which cause the computer to function as:
a current position detection device for detecting a current position of a movable body;
a map information presentation device for presenting map information corresponding to the detected current position;
a route condition information presentation device for presenting route condition information indicating a current condition of a route on which the movable body is driving, said condition including a presence of another movable body which is present ahead of the movable body; and
an overtaking information presentation device for presenting at least one information that the movable body can pass another movable body on the basis of the presented map information and the presented route condition information.

46. A computer data signal embodied in a carrier wave and representing a series of instructions which cause a computer in a navigation system for a movable body to function as:
a current position detection device for detecting a current position of a movable body;
a map information presentation device for presenting map information corresponding to the detected current position;
a route condition information presentation device for presenting route condition information indicating a current condition of a route on which the movable body is driving, said condition including a presence of another movable body which is present ahead of the movable body; and
an overtaking information presentation device for presenting at least one information that the movable body can pass another movable body on the basis of the presented map information and the presented route condition information.

* * * * *